United States Patent [19]

Matsuno et al.

[11] Patent Number: 4,883,937

[45] Date of Patent: Nov. 28, 1989

[54] BUTT WELDING METHOD BY MEANS OF LASER BEAM

[75] Inventors: Kenji Matsuno; Tsuneo Imatani; Nobuyuki Sato; Osamu Teruuchi; Hideo Kurashima, all of Kanagawa, Japan

[73] Assignee: Toyo Seikan Kaisha, Ltd., Tokyo, Japan

[21] Appl. No.: 248,061

[22] Filed: Sep. 23, 1988

[30] Foreign Application Priority Data

Sep. 30, 1987 [JP] Japan .................................. 62-244365
Oct. 16, 1987 [JP] Japan .................................. 62-259457
Feb. 26, 1988 [JP] Japan .................................. 63-42277

[51] Int. Cl.$^4$ .............................................. B23K 26/00
[52] U.S. Cl. ................................................. 219/121.64
[58] Field of Search ........................ 219/126.63, 121.64

[56] References Cited

U.S. PATENT DOCUMENTS 2,287,540  6/1942  Vang ................................. 219/105 X
3,314,041  5/1967  Olafson ............................. 219/105
4,737,612  4/1988  Bruck et al. ..................... 219/121 LD
4,751,365  6/1988  La Rocca et al. ............... 219/121.64

FOREIGN PATENT DOCUMENTS 0245145  11/1987  European Pat. Off. .
0139176  10/1980  Japan .
0199572  9/1986   Japan ............................. 219/121.64
1114985  5/1968   United Kingdom .

Primary Examiner—C. L. Albritton
Attorney, Agent, or Firm—Schwartz & Weinrieb

[57] ABSTRACT

Two thin plate members preferably made of metallic sheets are prepared and one end surface of at least one of the members is formed so as to have an inwardly curved recess which constitutes a gap when the end surfaces of the members are linearly butted together. A laser beam is irradiated along the butted portion of the members. The gap may have various forms having a predetermined width. The two members to be butt-welded may be substituted by two end portions of a single metallic sheet having a rectangular configuration in the case where a shell portion of a can is formed by the butt-welding operation.

21 Claims, 7 Drawing Sheets

BUTT WELDING METHOD BY MEANS OF LASER BEAM

FIELD OF THE INVENTION

This invention relates to a butt welding method especially by means of a laser beam, and more particularly to a method of butting thin plates to be welded together and irradiating the plates by means of a laser beam along the butted end surfaces of the plate materials so as to carry out the butt-welding pro- for manufacturing, for example, a barrel or shell portion of a can.

BACKGROUND OF THE INVENTION

It is well known to utilize a laser beam welding method for the butt-welding of thin metallic plate materials because the laser beam energy is able to be concentrated to a narrow range. In accordance with the butt-welding method for thin metallic plates by utilizing a laser beam, it is required to increase the density or concentration of the laser beam energy in accordance with an increase of the welding speed, but in a high speed welding method, adverse phenomena may be caused, such as, for example, humped protrusions, or so called humpings, which are discontinuously formed along the front side of the welded bead or the central portion of the welded portion continuously projects above the front surface of the welded plates while the rear side thereof is the recessed, which is so called undercut formation which is formed under certain welding conditions. In case such an adverse phenomenon progresses, the welded portion is broken so as to form a hole. In particular, for example, when a surface treated steel plate having a thickness of approximately 0.2 mm is welded at a welding speed of more than 30 m/min., such adverse phenomena will frequently occur.

In accordance with conventional laser beam welding method, is well known that the formation of a keyhole will occur due to the laser beam welding, and in the case of high speed welding, the keyhole does not extend directly downwardly but extends obliquely towards the downstream direction of the welding. For this reason, the welded portion protrudes upwardly and the undercut portion may also be formed upon the rear surface thereof or in other words the humping phenomenon may occur. Such a phenomenon remarkably occurs in a case where the laser beam is irradiated upon a flat plate or a so called bead-on plate. For example, this phenomenon usually occurs in the case of a laser beam migration speed of more than 20 m/min. with respect to a bead-on plate comprising a surface treated steel plate having a thickness of 0.2 mm. The reason why the humping phenomenon or formation of the protrusions occurs during the laser beam welding method in comparison with the butt welding method is based on the remarkable curving of the keyhole towards the downstream side of the welding direction.

In addition, a burr is liable to occur during the welding process because thin metallic plates to be welded together are generally cut by means of a slitter, and the burr formed at the butted portion may constitute an obstacle for the laser beam butt-welding process which will prevent attaining good welding conditions. Namely, the laser beam irradiated upon the butted portions of the thin metallic plates is reflected and the energy of the laser beam is dispersed therearound. Moreover, the burr having a relatively small mass will be immediately evaporated when the burr absorbs the laser beam energy and the evaporated metallic vapour may adversely prevent the complete penetration of the laser beam into the weld area, thus affecting the transmission efficiency of the laser beam. Since the lowering of such transmission efficiency of the laser beam is not made uniformly along the butted portion, of each plate the heating process step along the welded beads is not uniformly achieved, and therefore, this is the a significant problem for the laser beam welding.

U.S. Pat. No. 4,577,088 discloses a welding method for substantially eliminating the problems or disadvantages described above, and in accordance with this method, two members to be mutually butt-welded are inclined at predetermined angles so that the upper edges of the members are separated with respect to each other and pressure is applied to these members in the direction of the butted edges thereof so as to respectively achieve lineal contact of the members at the butted edge portions thereof. In this state, the laser beam is irradiated upon the butted portions in a direction inclined to the direction along which the butted ends of the members extend vertically. According to the welding method disclosed in this patent, the problems described hereinbefore can be somewhat resolved, and in this method, the burr of the thin metallic plate is positioned at a location away from the center of the irradiated laser beam, so that the problem regarding the existence of the burr may be resolved.

However, in the method disclosed in the U.S. Pat. No. 4,577,088, the members to be welded are butted at a predetermined open angle with respect to each other so as to obtain a lineal contact of the butted portions of the members to be welded, whereby discordance between the butted portions thereof may be easily caused, and accordingly, it is difficult to accurately and stably butt or mate the end portions of the members to be welded. In addition, the butting of the members is performed at a predetermined open angle, so that the butted surfaces after completion of the butt-welding is not made substantially flat and may be formed in a skewed manner.

Furthermore, the contacting portion and the portion near this contacting portion of the lower end portions of the butted portions of the members to be welded have relatively small masses, so that these portions are liable to develop holes as a result of evaporation within a short period of time when the laser beam is irradiated upon these portions such as in the case where sheets having extremely thin thicknesses are butt-welded.

OBJECTS OF THE INVENTION

An object of this invention is to substantially eliminate the defects or drawbacks described above and to provide a butt-welding method capable of achieving a stable linear butt-weld by utilizing a laser beam with a uniform welded portion with substantially no holes developed therein.

Another object of this invention is to provide a butt-welding method capable of achieving an effective heat or energy transfer efficiency and which can obtain a superior linearly flat welded joint portion with no holes and no humping developed therein by utilizing a laser beam.

SUMMARY OF THE INVENTION

These and other objects can be achieved according to this invention, and in accordance with one aspect thereof, by providing a method of butt-welding thin plate members respectively provided with end surfaces to be butted together, wherein a recess is formed within the end surface of at least one of the thin plate members, the end surfaces are linearly butted with a gap defined therebetween by means of the formed recess, and laser beam is irradiated along the butted portions of the end surfaces of the thin plate members.

According to the method described above, the formation of the gap between the butted end surfaces of the thin plate members allows the keyhole to be directed downwardly. The metallic vapour generated by means of the energy of the irradiated laser beam does not flow out through the gap, so that the fused, metal does not protrude above the front surface of the thin plate members, thus exhibiting substantially no humping or any similar adverse phenomenon.

Namely, according to the method described above, it is characterized that a gap having a predetermined dimension is formed between the butted surfaces of the thin plate members, and a portion of the metal material of the members fused by means of the irradiation of the laser beam is irradiated into the gap disposed upstream of the portion being subjected to the welding operation. Thus, in comparison with the case in which no gap is formed between the end surfaces to be butt-welded, the keyhole progresses linearly downwardly, and accordingly, a stable welding operation can be realized even during a high speed welding operation. As described above, the keyhole is formed relatively linearly along the thickness direction of the butted end surfaces and the fused metal is gradually embedded within the keyhole as the welding operation progresses so as to thereby perform a stable welding operation. In the case where the gap formed between the butted end surfaces has a wide width, the laser beam is traverses the gap without being surrounded by means of the fused metal, and accordingly, a welding fault may be developed within that region. In order to obviate such adverse phenomenon, it is required that the gap to have a suitably predetermined width in the direction normal to the butted end surfaces.

In addition, according to the method of this invention, since the end surfaces of the thin plate members can be butted substantially linearly, beads formed due to the welding operation do not have warped shapes, thus attaining the precise and stable welded effects.

In accordance with another aspect of this invention, the aforementioned and other objects can be also achieved by providing a method of butt-welding end surfaces of a rectangular thin sheet plate, wherein an upper edge portion of the end surface of the sheet plate is chamfered, the end surfaces are butted together in a linear fashion so as to define a recess formed by means of the chamfered upper edge, and a laser beam is irradiated along the recess formed within the butted end surfaces of the sheet plate so as to thereby perform the butt-welding operation.

According to the butt-welding method of this type, upon burr is formed on the surface of the butted portion upon which a laser beam is irradiated and a recess is formed upon that surface so as to easily receive the laser beam, thus improving the heat transfer efficiency due to the laser beam energy and hardly generating any plasma due to the metal evaporation. Accordingly, the laser beam energy can be stably transferred with high degree of efficiency and hence the formation of the weld beads can be uniformly made. Moreover, the butting operation is carried out throughout the relatively wide contact width or length, so that a stable and flat welded condition can be realized. In addition, the formation of the protrusion having substantially the same volume as that of the recess and formed the surface side opposed to the recessed surface side can positively prevent the reduction of the volume of the fused metal, thus preventing the generation or development of an undercut within that region.

BRIEF DESCRIPTION OF THE DRAWINGS

The preferred embodiments will be described further in detail hereunder with reference to the accompanying drawings, wherein.

DESCRIPTION OF THE PREFERRED EMBODIMENTS

Figure 1:
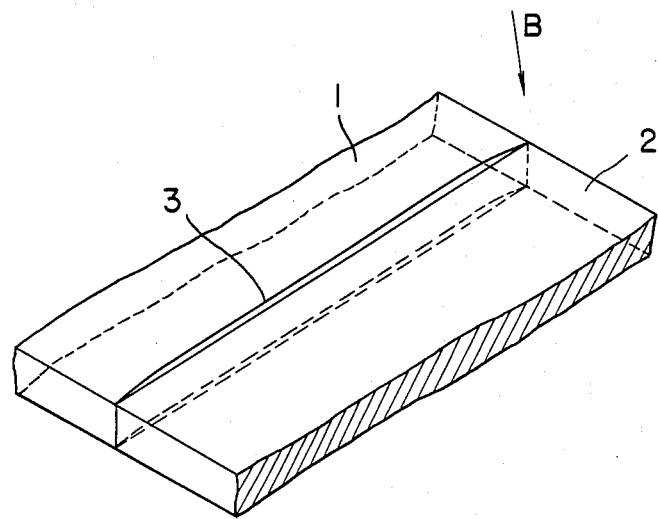
FIG. 1 is a perspective view of two members to be butt-welded together according to one preferred embodiment of this invention.

Referring to FIG. 1 representing the first embodiment according to this invention, reference numerals 1 and 2 denote thin metallic plates as members to be welded together, and it is seen that the metallic plate 1 is provided with a curved end surface having protruding lateral end portions and a central portion recessed with respect to the protruding end portions, so that a gap 3 is formed between the end surfaces of the thin metallic plates 1 and 2 when the metallic plate 1 is butted against the end surface of the metallic plate 2. The formation of the metallic plate 1 so as to have an end surface of the shape described above, may be performed by means of a cutting tool such as, for example, a shearing machine or a punching press having a slightly bent or crooked cutting blade. The members 1 and 2 to be welded together are relatively moved with respect to a laser beam or beams, which is designated by means of the letter B in FIG. 1 and is denoted as a single beam herein for the sake of convenience, by means of a known transferring device so as to thereby obtain a butt-welded portion with no bumping. In accordance with this butt-welding operation, it is preferred that the gap 3 defined between the end surfaces of the butted members 1 and 2 has a width greater than the wave length of the laser beam which penetrates the gap 3 (for example, 10.6 m of a laser beam of $CO_2$ gas) and that the width of the gap 3 at the central portion of the butted portions in the direction normal to the welding direction is less than 25%, preferably 20%, of the thickness of the plate member to be welded. If the width of the gap 3 is greater than 25% of the thickness of the metallic plate, the thickness of the welded portion is reduced, which results in a lowering of the welding strength and the formation of weldholes.

One example of a concrete experiment conducted in accordance with the first embodiment will be described hereunder.

An epoxy phenolic resin type paint was applied to a surface constituting an inner surface of the shell of a can made of a thin tin-free steel plate having a thickness of 0.21 mm including a metallic chromium layer having a chromium amount of 100 mg/m$^2$ and an oxide chrominum layer having a converted chromium amount of 15 mg/m$^2$, and a surface constituting the outer surface of the shell of the can was also coated so as to thereby prepare the material to be welded. The thus prepared material was then cut into blanks by means of a shearing machine. During the cutting operation by means of the shearing machine, one end surface of one blank to be butted was cut in a curved shape such that both lateral end portions protruded while the central portion was recessed, and the other end surface of the other blank to be butted was cut in a linear shape.

In the next step, the thus formed blank was rolled so as to form a cylindrical member having an inner diameter of 65.3 mm and a height of 104.7 mm. The dimensions of the recesses of the central portions of the blanks at the blank cutting time were determined so that the maximum widths of the gaps formed between the butted portions at the butting time of the cylindrical member are each within the range of 0.03 mm and 0.04 mm. The pair of end surfaces of the cylindrical blank was linearly butted together and then moved at a speed of 50 m/min. while irradiating a laser beam onto the butted portion so as to carry out the welding operation. For this welding operation, a $CO_2$ gas laser having an output of 2.2 kw was utilized and the laser beam emitted therefrom was concentrated by using a lens means having a focal distance of 63.5 mm.

Figure 9:
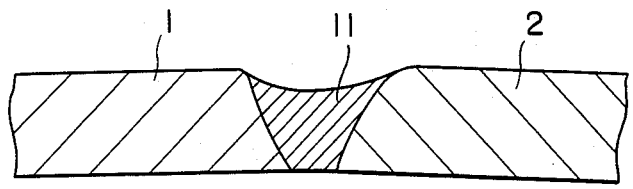
FIG. 9 is an enlarged sectional view of a welded portion of the member welded in accordance with the embodiment shown in FIG. 1.

FIG. 9 is an illustration on an enlarged scale showing a cross section of the welded portion of the thus formed shell of the can formed from the blank having a butting gap of 0.04 mm, which was then corroded with 5% nitric acid alcohol solution.

For the sake of comparison, welding operations were carried out by using a blank having a maximum gap width of 0.07 mm at the butting portion and a blank having both ends linearly cut, that is having substantially no gap at the central portion thereof.

Figure 10:
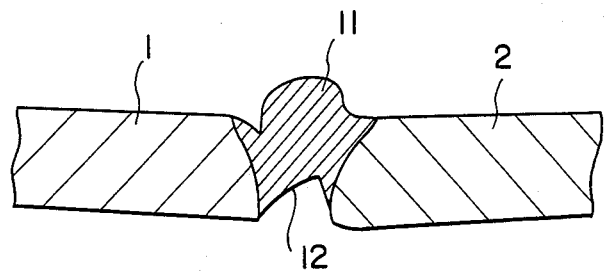
FIG. 10 is an enlarged sectional view of a welded portion in accordance with a conventional welding method.

FIG. 10 is an illustration on an enlarged scale showing a cross section of the welded portion of the obtained shell of the can formed from the blank having substantially no gap, which was then corroded with 5% nitric acid alcohol solution. As can be seen from FIG. 10, in the case of no butting gap, the protrusion of the fused and solidified portion 11 and the undercut 12 formed upon the rear surface of the plate were clearly observed. In contrast, in the case of the maximum butting gap widths of 0.03 mm and 0.04 mm of the blanks used according to this invention, such protrusion and undercut 12 were not observed at all upon the laser beam irradiated surface and the rear surface thereof, respectively thereby obtaining an excellent welded portion or surface.

On the other hand, in the case of the maximum gap width of 0.07 mm for the blank, a relatively large recess was formed upon the laser beam irradiated and fused surface, thereby reducing the strength of the welded portion.

The second embodiment according to this invention will be described hereunder with reference to FIG. 2 in which like reference numerals are added to members or portions corresponding to those shown in FIG. 1.

Figure 2:
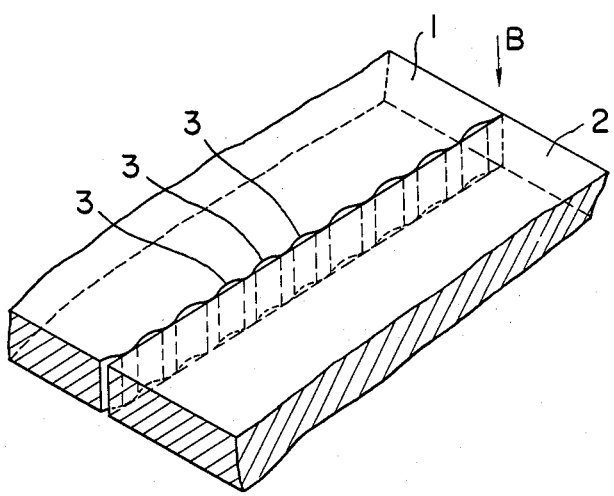
FIG. 2 is a perspective view similar to FIG. 1 according to another embodiment of this invention.

Referring to FIG. 2, one member 1 to be butt-welded has an end surface having a plurality of intermittent gaps 3 extending in the welding direction formed in association with an end surface of the other member 2 to be butt-welded. According to this arrangement, the adjustment of the gaps can be easily made in comparison with the first embodiment. The butted members 1 and 2 as shown in FIG. 2 are welded together by means of the laser beam B in substantially the same manner as that described with respect to the first embodiment. In accordance with this welding method, it is preferred that the gap width is less than 35% of the thickness of the plate member in the case where the gap is formed entirely in the vertical direction thereof as viewed in FIG. 2. In comparison with the first embodiment, even if each gap is formed so as to have a width somewhat larger than that of the first embodiment, the entire area of the respective gaps is made smaller than that of the latter, so that the thickness of the welded portion is hardly reduced and a weldhole is hardly formed. The desired widening of the respective gap widths can attain the effect due to the location of the gaps and hence can attain the excellent welded condition. The length of the actually contacting portions of the butted surfaces of the members 1 and 2 between the respective gaps is preferably to be less than twice the diameters of the laser beam, and more preferably less than the diameter thereof, for maintaining the effect due to the location of the gaps throughout the entire surface of the welded portion.

Figure 5:
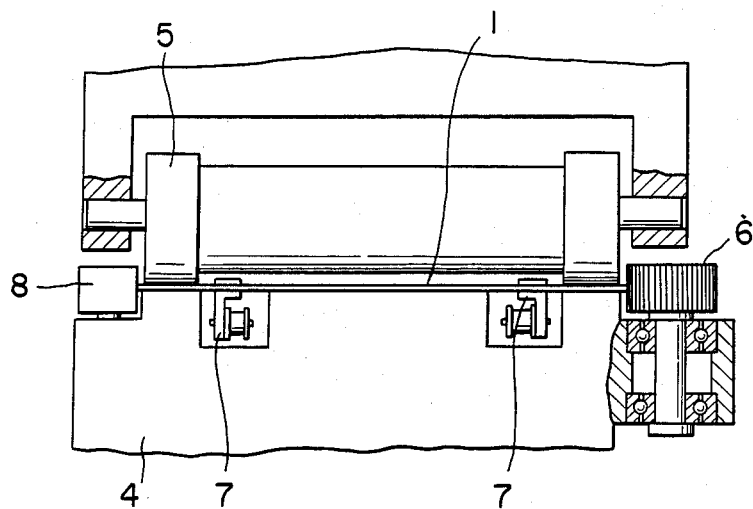
FIG. 5 is a front view, partially in section, of a device for working the member to be butt-welded for carrying out the embodiment of FIG. 2.

The member 1 to be welded is worked by means of, for example, a knurling tool 6 as shown in FIG. 5 so as to obtain the end surface of the member 1 as shown in FIG. 2. Namely, the member 1 is transferred between a table 4 and an upper press roll 5 under the condition wherein the same is pressed by means of pickers 7, and during the transfer operation, the member 1 is pressed by means of a side roll 8 and the knurling tool 6. Accordingly, protrusions and recesses formed upon the surface of the knurling tool 6 are transferred to one side surface of the member 1 to be welded by press-contacting the knurling tool 6 upon the member 1. In another method of shaping the end surface of the member 1, the member 1 is cut by means of a cutting operation using a milling machine so as or grinding machine to form an end surface of the member 1 upon which the protrusions and recesses thereof are formed.

One preferred experimental example based upon the second embodiment of this invention will now be described hereunder.

An epoxy phenolic resin type paint was applied to a surface constituting the inner surface of the shell of a can made of a thin tin-free steel plate having a thickness of 0.21 mm including a metalic chromium layer having chromium amount of 100 mg/m$^2$ and an oxide chromium layer having a converted chromium amount of 15 mg/m$^2$, and a surface constituting the outer surface thereof was subjected to a printing operation, and the plate was then cut into blanks. One end surface of the blank was thereafter worked so as to exhibit the sawtoothed surface by means of the device shown in FIG. 5. The maximum depth of the saw-toothed portion was of the order of 0.04 mm and the pitch thereof was set to 0.1 mm.

The blank was then rolled so as to form a cylindrical shape having an inner diameter of 65.3 mm and a height of 104.7 mm. The end surfaces of the cylindrical blank were linearly butted together while irradiating a laser beam onto the butted portion so as to carry out the welding operation, and for this welding operation, $CO_2$ a gas laser having an output of 2.2 kw was utilized and the laser beam emitted therefrom was concentrated by using a lens means having a focal distance of 63.5 mm.

Figure 11:
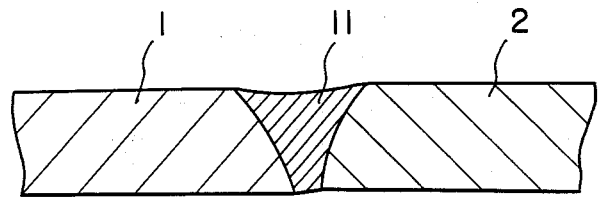
FIG. 11 is a sectional view similar to FIG. 9 showing a welded portion of the member welded in accordance with the embodiment shown in FIGS. 2 and 7.

FIG. 11 is an illustration on an enlarged scale showing a cross section of the welded portion of the shell of the welded can, which was corroded by means of a 5% nitric acid alcohol solution. As shown in FIG. 11, the fused and solidified portion of the welded portion provides upon protrusion on the laser beam irradiated surface and upon undercut on the rear surface thereof, thus exhibiting a smooth welded portion with substantially no faults.

Figure 3:
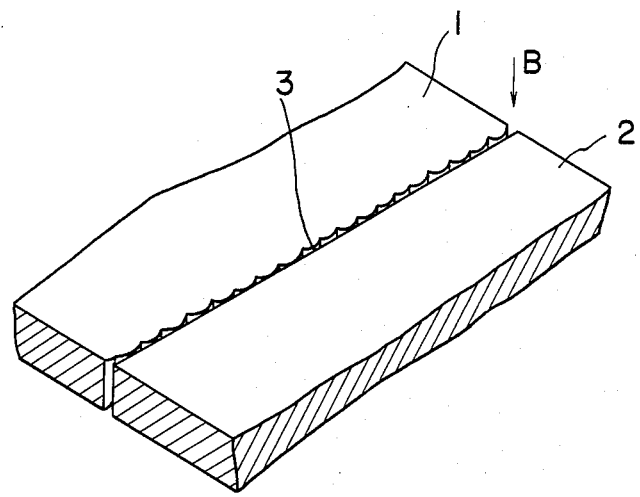
FIG. 3 is also a perspective view similar to FIG. 1 or FIG. 2 according to a further embodiment of this invention.

FIG. 3 represents the third embodiment according to this invention in which like reference numerals are added to members or portions corresponding to those shown in FIG. 1 or 2.

Referring to FIG. 3, the end surface of the member 1 to be butt-welded is formed so as to have a wave shape similar to that shown in FIG. 2, but in this embodiment, it is noted that in lieu of the concave recesses 3 of the embodiment of FIG. 2, the present embodiment comprises convex projections 3 which are to be disposed in butt contact with the end surface of blank portion or member 2. Nevertheless, as a result of the end surface of blank member 1 having such a construction, substantially the same effects as those of the second embodiment can be attained.

Figure 4:
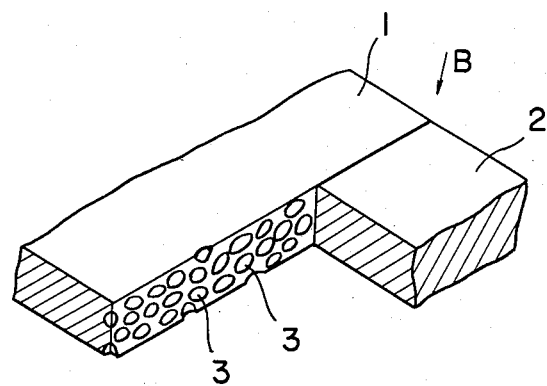
FIG. 4 is a perspective view, partially cut away, similar to any one of FIGS. 1, 2 and 3 according to a still further embodiment according to this invention.

FIG. 4 represents the fourth embodiment according to this invention in which like reference numerals are also added to members or portions corresponding to those shown in FIGS. 1, 2 or 3.

Referring to FIG. 4, partially broken away for the sake of explanation, the gaps 3 are formed as indents or cavities each of which does not continuously penetrate the upper and lower surfaces of the member 1 in the direction of the thickness thereof. The gaps 3 of this embodiment may be formed continuously or intermittently upon the end surface of the member 1. The gaps 3 may also be open at the front surface of the member 1. The fourth embodiment can also attain substantially all of the same effects as those attained by means of the second embodiment.

As a method of forming the plurality of fine gaps 3 upon the end surface of at least one member to be buttwelded such as shown in FIG. 4, there is provided a sand-blast working method or alternatively the device described and shown in FIG. 5 may be utilized by pressing the device against the end surface of the member to be butted so as to thereby transfer thereto the recesses or indents thereon.

Figure 6:
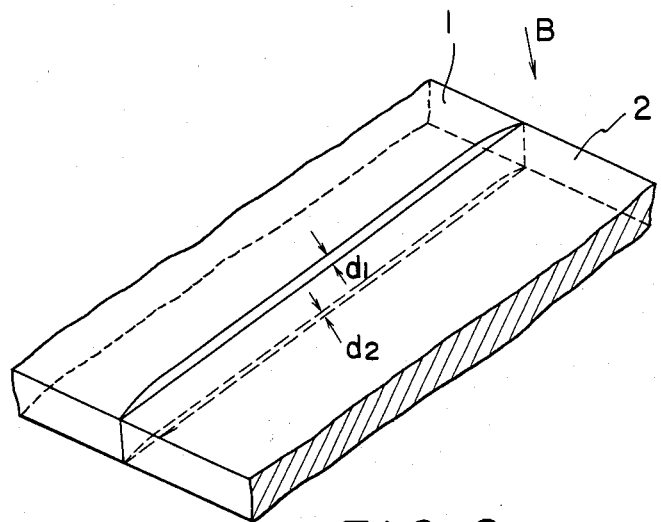
FIGS. 6 and 7 are perspective views similar to any one of those shown in FIGS. 1 to 4 according to still further embodiments of this invention.

FIG. 6 represents the fifth embodiment according to this invention, in which reference numerals 1 and 2 denote thin metallic plates to be welded together. The thin metallic plate 1 is provided with one end surface to be butted which has protruding lateral end portions and a recessed intermediate portion so as to exhibit an inwardly curved configuration. The recessed portion has a depth $d_1$ at the upper portion, thereof that is, the front surface side, and a depth $d_2$ at the lower portion, thereof that is, the rear surface side, which is smaller than the depth $d_1$. This recessed portion therefore defines a gap 3 when the end surface of the thin metallic plate 1 is butted to the other thin metallic plate 2. The formation of the end surface of the metallic plate 1 will be achieved by using a cutting tool such as, for example, a shearing machine or a punching press having a blade shape slightly deformed from a linear shape. The thus butted metallic plates 1 and 2 shown in FIG. 6 are relatively moved with respect to the laser beam B by means of a known transferring device so as to thereby weld the butted portions with no humping resulting.

Figure 7:
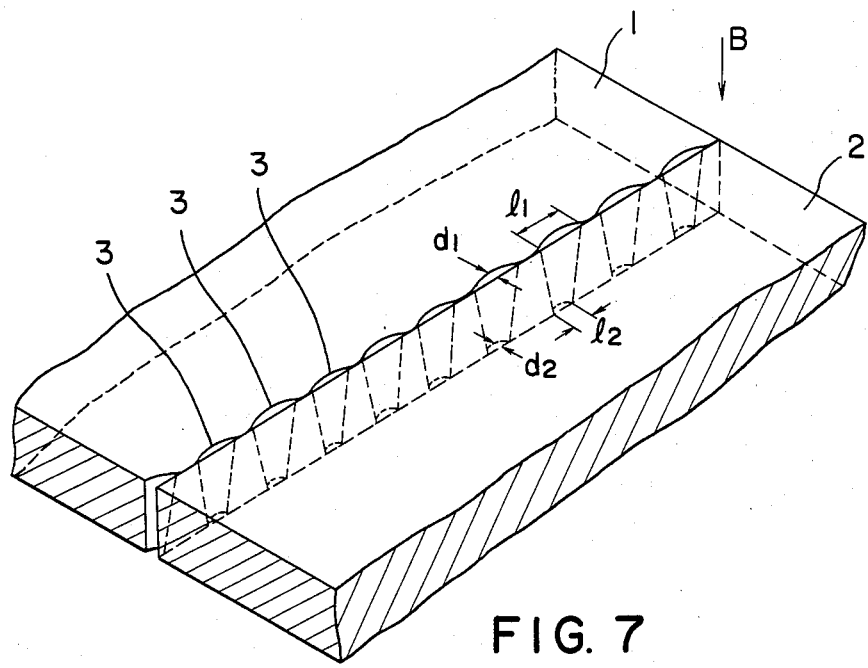

FIG. 7 represents the sixth embodiment according to this invention, in which like reference numerals are added to members or portions corresponding to those of the former embodiments. With the embodiment shown in FIG. 7, gaps 3 formed at the butted portion of members 1 and 2 to be butt-welded together are located intermittently in the welding direction, and according to this embodiment, as described with respect to the second embodiment, the adjustment of the gaps can easily be made in comparison with the fifth embodiment. The thus butted portion of the members 1 and 2 is welded by means of the laser beam B as described before with respect to the former embodiment. As shown in FIG. 7, each gap 3 has an upper width $d_1$ which is larger than the lower width $d_2$ which is preferably of the order of more than 3 $\mu$m and less than 25 $\mu$m, and preferbly, more than 3 $\mu$m and less than 15 $\mu$m for the reason that if the width $d_2$ is less than 3 $\mu$m the laser beam does not sufficiently penetrate the lower side of the butted portion and if the width $d_2$ is in excess of 25 $\mu$m the laser beam passes through the gaps and the transferring efficiency of the laser beam energy is not effective. In an adverse case, the fused metals may not be mated together within the wide gap defined therebetween. With this embodiment, the length of each gap in the welding direction is determined such that the upper length $l_1$ is larger than the lower length $l_2$, but this is not a matter of significance and the lengths $l_1$ and $l_2$ may be made equal. According to this embodiment, even in the case of increased widths of the respective gaps, since the entire volume of the gaps can be totally made small in comparison with that of the former embodiment of FIG. 6, the thickness of the welded portion is hardly reduced and a weld hole is also hardly formed. The increasing of the widths of the gaps improves the effects due to the location of the gaps and makes it possible to achieve the improved welded condition. It is preferred that the contacting lengths of the butted portion of the members 1 and 2 defined between the mutually adjacent gaps is less than twice the diameter, more preferably less than that, of the laser beam for suitably maintaining the effects due to the location of the gaps throughout the entire length of the welded portion. The existence of the contact portions between the gaps makes it possible to easily and precisely butt the respective members to be welded together. The end surface of the member 1 is worked so as to obtain the shape shown in FIG. 7 by means of, for example, a knurling tool 6 shown in FIG. 8. Namely, the member 1 to be welded is transferred between the table 4 and the upper press roll 5 under the condition wherein the same is pressed by means of the pickers 7, and during the transfer therebetween, the member 1 is pressed by means of the side roll 8 and the knurling tool 6 so as to thereby transfer the surface condition, that is, the protruding and recessed forms, of the knurling tool 6 onto the end surface of the member 1. Since the knurling tool 6 is biased by means of a spring 9 disposed within an inclined state, the end surface of the member 1 is worked so as to have a shape, as shown in FIG. 7, having deep upper recessed portions and the narrow lower recessed portions forming the gap when butted to the other member 2. The surface formation of this shape may alternatively be made by partially cutting out the end surface of the member 1 by using a cutting machine such as, for example, a milling cutter or grinding machine.

A concrete example of this embodiment will now be described with reference to an experiment carried out therefor.

Figure 8:
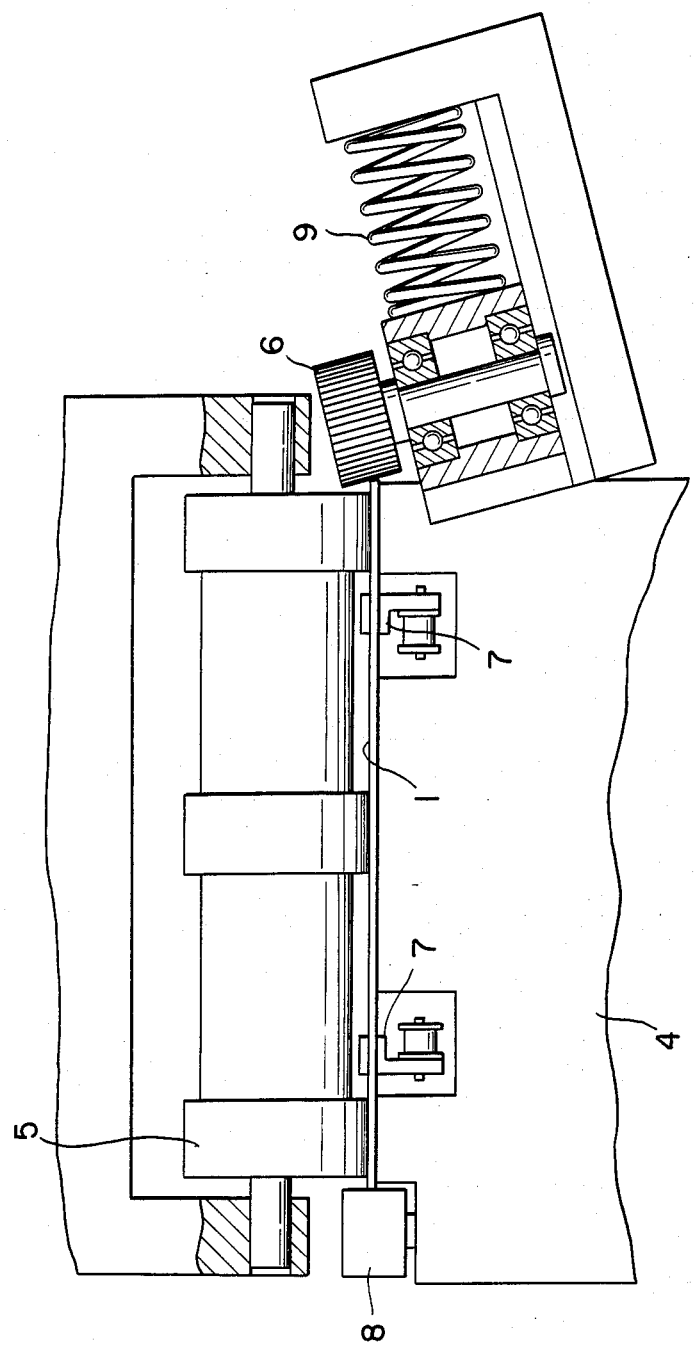
FIG. 8 is a front view, partially in section, of a device for working the member to be butt-welded for carrying out the embodiment shown in FIG. 7.

A thin steel plate having a thickness of 0.21 mm was first prepared and one end surface was worked by utilizing the device shown in FIG. 8 so as to form sawtoothed protrusions and recesses upon the end surface thereof. Each of the recesses had an upper portion having a depth of approximately 0.04 mm and a lower portion having a depth of approximately 0.01 mm, and the pitch of the recess was of the order of 0.10 mm. One end surface of the other member 2 to be butted having no protrusion or recesses was then butted substantially linearly to the thus worked end surface of the member 1 and the butt-welding operation was carried out along the butted portion by means of a laser beam having an output of 1.8 kw at a welding speed of approximately 60 m/min. The cross section of the thus welded portion is represented by means of FIG. 11, and as is apparent from FIG. 11, the fused and solidified portion 11 of the welded portion has substantially upon protrusion on the laser beam irradiated surface and upon undercut on the rear surface thereof, thus having exhibiting an excellent welded portion with substantially no faults.

With the embodiments of this invention described above, a thin metallic plate such as steel plate, surface treated steel plate such as tin-plate or tin-free steel plate an, aluminum plate or an aluminum alloy plate is preferably used as the members to butt-welded together, but as an alternative alternation, a plastic plate may possibly be used. Although it is further preferred that the member to be welded has a thickness of 0.15 to 0.4 mm, these embodiments are not specifically limited to such a thickness value.

Furthermore, with the first to sixth embodiments described above, although only the one member is worked so as to have a recess or recesses upon the end surface thereof, the formation of such recess or recesses upon the end surface of the other member to be butt-welded to the first mentioned member may be within the scope of this invention. At any rate, the essential feature of the present invention is that a gap or gaps are formed between two members to be mutually welded to each other when linearly butted together.

In the aforementioned embodiments according to this invention, it has been disclosed that the butt-welding operation has been carried out with respect to two separate members 1 and 2, but it will be easily understood by those skilled in the art that the two members may be substituted by two end portions of a single sheet plate preferably having a rectangular configuration in the case where a shell portion of a cylindrical can, for example, is formed by the butt-welding methods described above, as will be described hereinafter with reference to the other embodiments of this invention.

The seventh embodiment according to this invention will now be described with reference to FIGS. 12A and 12B.

Figure 12A:
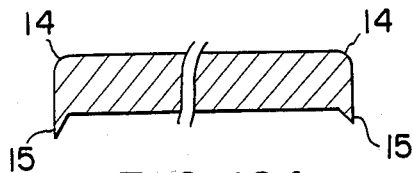
FIGS. 12A and 12B are sequential sectional views of a member to be butt-welded in accordance with a still further embodiment of this invention.
Figure 12B:
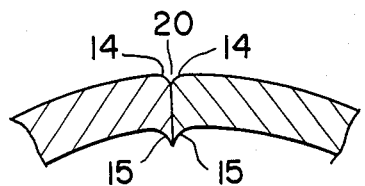

According to this embodiment, a metallic sheet which is to serve as a member to be welded is punched out by means of a press so as to have a cross section as shown in FIG. 12A, and during this punching operation, depressions 14 and burrs 15 are formed upon the same surface sides respectively. Both end surfaces of the punched out metallic sheet are linearly butted together so as to form a cylindrical member so that the depressions 14 and the burrs 15 are disposed at the upper and lower surfaces respectively of the butted portion as shown in FIG. 12B.

The laser beam is continuously irradiated upon the recess 20 formed by mean of the depressions 14 from the upper side of the butted portion in a direction normal to the surface of the drawing, thereby effectively transferring heat to the workpiece. In this operation, since the volumes of the depressions 14 and the burrs 15 are substantially equal, the reduction of the volume due to the welding process is substantially eliminated and the undercut does not occur.

Figure 13A:
FIGS. 13A to 13C and 14A to 14C are both sequential sectional views of members to be butt-welded in accordance with still further embodiments of this invention.
Figure 13B:
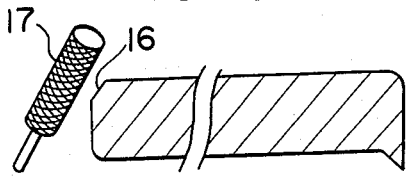
Figure 13C:
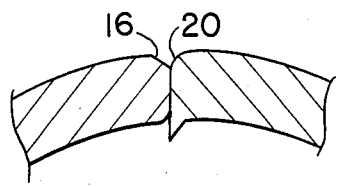

FIGS. 13A-13C represent the eighth embodiment according to this invention, in which a metallic sheet blank is cut by means of a slitter and the depressions and the burrs are formed upon both the front and rear surfaces. The burrs formed upon one surface are removed by means of a grinder 17 so as to form a chamferred surface 16 as shown in FIG. 13B. A cylindrical member is formed by butting together the thus formed end surfaces of the metallic sheet blank so that a recess 20 is formed upon the outer surface of the butted portion by means of the depressions and the chamferred surface 16. The laser beam is irradiated upon the recess 20 in the manner described before so as to thereby provide a stably welded portion.

Figure 14A:
Figure 14B:
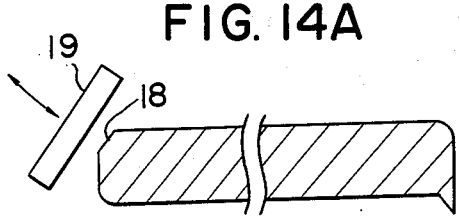
Figure 14C:
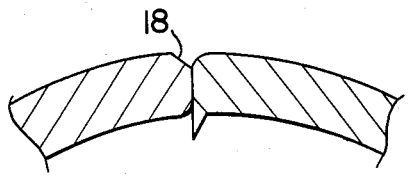

FIGS. 14A-14C further represent the ninth embodiment according to this invention, in which a metallic sheet blank is worked in substantially the same manner described with reference to the former eighth embodiment. The burr upon one side of this metallic sheet blank is rapped and crushed by means of a bumping bar 19 so as to form a chamferred surface 18, and the welding steps thereafter are substantially the same as to those described with reference to the eighth embodiment.

Figure 15:
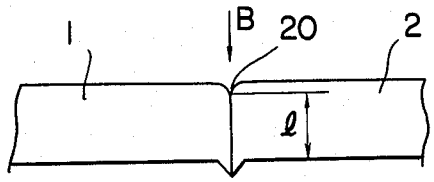
FIG. 15 is an enlarged sectional view of a welded portion of the member welded in accordance with one of the embodiments shown in FIGS. 12 to 14.).

With the seventh to ninth embodiments described above, as shown in FIG. 15, both end surfaces of an elongated rectangular metallic sheet are butted together as members 1 and 2 to be butt-welded, and the upper edges of the butted end surfaces form in combination a recess 20 upon and along which a laser beam is irradiated from the arrowed direction B. It is preferred that the contact length in the vertical direction as viewed along the members 1 and 2 is made considerably large, and preferably, is made in excess of 75% of the thickness of the sheet blank so as to thereby effectively eliminate the occurrence of a weld hole. In addition, the burns are not formed upon the surfaces of the members upon which the laser beam is irradiated and the recess is formed upon that surface, so that the laser beams can be easily received and the laser beam energy can be stably and effectively transferred. Moreover, plasma is hardly generated due to the metallic evaporation. Furthermore, the burrs formed during the sheet blank cutting operation are located upon the lower side as viewed with respect to the butted portion, so that the burrs are fused during the welding operation and form beads, thus preventing the formation of the undercut upon the lower surface of the welded portion.

Obviously, many modifications and variations of the present invention are possible in light of the above teachings. It is therefore to be understood that within the scope of the appended claims, the present invention may be practiced otherwise than as specifically described herein.

What is claimed is:

1. A method of butt-welding thin plate members, comprising the steps of:
   preparing thin plate members, having a thickness less than or equal to approximately 0.4 mm, provided with end surfaces to be butted together, respectively;
   forming a recess means in the end surface of at least one of said thin plate members;
   butting linearly said end surfaces of said thin plate members to each other at at least two laterally spaced regions and substantially throughout the thickness of said members so as to define a stable butt contact with respect to each other and with a gap, defined by said recess means, therebetween; and
   irradiating a laser beam, at a high rate of speed of at least 20 m/min, along said butted end surfaces of said thin plate members so as to include said recess means whereby said end surfaces of said butted plate members are welded together without the generation of protrusions and undercuts, as welding faults, upon the laser beam side, and the opposite side, surfaces, respectively, of said plate members.

2. The method according to claim 1 wherein said recess means is formed by means of lateral end portions of one end surface of one of said thin plate members protruding outwardly and a central portion thereof recessed inwardly and said protruding end portions are disposed in contact with the other end surface of the other thin plate member under pressure when said thin plate members are butted.

3. The method according to claim 1 wherein said recess means comprises a plurality of small recesses disposed along a width direction of the thin plate member and extending throughout a thickness direction thereof.

4. The method according to claim 1 wherein said recess means comprises a plurality of small recesses disposed along a width direction of the thin plate member and partially extending in a thickness direction thereof.

5. The method according to claim 1 wherein said gap defined by means of said butted end surface of the thin plate members has a width in a direction normal to the butted surface larger than a wave length of said irradiating laser beam and less than 25% of the thickness of the thin plate member at a central portion of the butted end surfaces.

6. The method according to claim 1 wherein a maximum width of said gap in a direction normal to the butted surfaces is 0.04 mm.

7. The method according to claim 1, wherein:
   said recess means formed within an end surface of one of said thin plate members to be butted to another one of said thin plate members has an upper portion disposed toward said irradiating laser beam, and a lower portion having a depth smaller than that of said upper portion so as to define said gap between said thin plate members when butted together.

8. The method according to claim 7 wherein said recess means is formed by lateral end portions of one end surface protruding outwardly and a central portion recessed inwardly and said protruding end portions are disposed in contact with to the other end surface of the other thin plate member under pressure when said thin plate members are butted together.

9. The method according to claim 7 wherein said recess means comprises a plurality of small recesses disposed along a width direction of the thin plate member and extending throughout a thickness direction thereof.

10. The method according to claim 7 wherein the depth of the lower portion of said recess means is within the approximate range of 3 to 25 μm.

11. A method of butt-welding opposite ends of a thin plate member, comprising the steps of:
    preparing a rectangular sheet plate provided with end surfaces to be butted to each other and having a thickness which is substantially equal to or less than 0.4 mm;
    chamferring an upper edge portion of said sheet plate to a side of which a laser beam is to be irradiated;
    butting linearly said end surfaces of said sheet plate to each other substantially throughout the thickness of said end surfaces of said sheet plate so as to define a stable butt contact with respect to each other and to dispose said chamferred upper edge portion of said sheet plate within an upper surface portion of said sheet plate and thereby define a recess within said upper surface portion of said butted sheet plate; and
    irradiating a laser beam, at a high rate of speed of at least 20 m/min, along said recess formed by said butted end surfaces of said sheet plate whereby said end surfaces of said butted sheet plate are welded together without the generation of protrusions and undercuts, as welding faults, upon the laser beam side, and the opposite side, surfaces, respectively, of said sheet plate.

12. The method according to claim 11 wherein a protrusion having a volume substantially the same as that of said recess is formed at a lower edge of said butted end surfaces of the sheet plate.

13. The method according to claim 11 wherein a distance of the end surfaces of the sheet plate substantially butted to each other in a thickness direction thereof is less than 70% of the thickness of the sheet plate.

14. The method according to claim 11 wherein said sheet plate is prepared by a punch-out working and wherein a recess is formed on one side of the sheet plate with the depression formed during the sheet plate preparing process and a protrusion is formed on the other side thereof with a burr formed during the sheet plate preparing process.

15. A method as set forth in claim 1, wherein:
said recess means comprises a plurality of concavely configured recesses disposed in a serial array across the lateral extent of said one of said thin plate members; and a plurality of flattened, non-recessed portions alternately interposed between said recesses.

16. A method as set forth in claim 1, wherein said recess means comprises:
a plurality of convex protrusions serially connected to each other and disposed in an array extending across the lateral extent of said one of said thin plate members so as to define a substantially wave-shaped, scallopped configuration.

17. A method as set forth in claim 1, wherein said recess means comprises:
a plurality of cavities each of which has a depth dimension, in the direction of said thickness of said one of said thin plate members, which is less than said thickness of said one of said thin plate members.

18. A method as set forth in claim 17, wherein:
said plurality of cavities are formed in a random pattern within said end surface of said one of said thin plate members.

19. A method as set forth in claim 15, wherein:
the width of said recesses, as defined in a direction extending along said lateral extent of said one of said thin plate members, is greater within the vicinity of said laser beam side of said thin plate member than within the vicinity of said opposite side of said thin plate member.

20. A method as set forth in claim 1, wherein:
said thin plate members are fabricated from a material which may be selected from the group conprising steel, tin-coated steel, aluminum, aluminum alloy, and plastic materials.

21. A method as set forth in claim 11, wherein:
said butted end surfaces of said sheet plate, and said sheet plate, together define a welded can body.

* * * * *